United States Patent
Tawarayama et al.

(10) Patent No.: US 10,076,704 B2
(45) Date of Patent: Sep. 18, 2018

(54) GAME DEVICE

(71) Applicant: CAPCOM Co., Ltd., Osaka (JP)

(72) Inventors: Haruka Tawarayama, Osaka (JP); Hsinyun Hsieh, Osaka (JP); Yoshiyuki Yoshita, Osaka (JP); Naoki Maeda, Osaka (JP); Naoki Tarama, Osaka (JP); Takenobu Fujishima, Osaka (JP)

(73) Assignee: CAPCOM CO., LTD., Osaka-Shi, Osaka (JP)

( * ) Notice: Subject to any disclaimer, the term of this patent is extended or adjusted under 35 U.S.C. 154(b) by 422 days.

(21) Appl. No.: 14/775,131

(22) PCT Filed: Mar. 11, 2014

(86) PCT No.: PCT/JP2014/056276
§ 371 (c)(1),
(2) Date: Sep. 11, 2015

(87) PCT Pub. No.: WO2014/142104
PCT Pub. Date: Sep. 18, 2014

(65) Prior Publication Data
US 2016/0023110 A1 Jan. 28, 2016

(30) Foreign Application Priority Data

Mar. 11, 2013 (JP) .................................. 2013-047903
Jun. 3, 2013 (JP) .................................. 2013-116930

(51) Int. Cl.
*A63F 13/577* (2014.01)
*A63F 13/44* (2014.01)
(Continued)

(52) U.S. Cl.
CPC .............. *A63F 13/44* (2014.09); *A63F 13/55* (2014.09); *A63F 13/56* (2014.09); *A63F 13/577* (2014.09); *A63F 13/803* (2014.09)

(58) Field of Classification Search
CPC ........ A63F 13/44; A63F 13/803; A63F 13/55; A63F 13/577; A63F 13/814
(Continued)

(56) References Cited

U.S. PATENT DOCUMENTS

2008/0188305 A1   8/2008  Yamazaki et al.
2009/0069096 A1   3/2009  Nishimoto
(Continued)

FOREIGN PATENT DOCUMENTS

JP    H08-305356 A    11/1996
JP    2000-079280 A    3/2000
(Continued)

OTHER PUBLICATIONS

Missile Command: No Cities Left, http://www.eurogamer.net/articles/missile-command-review.*
(Continued)

*Primary Examiner* — Omkar Deodhar
*Assistant Examiner* — Ross Williams
(74) *Attorney, Agent, or Firm* — IP Business Solutions, LLC (57) ABSTRACT

In such a timing game that a user taps on a collision position at a time when fore ends of a line object 51A and a line object 51B (hereinafter line objects 51) collide, a background image in perspective is displayed as if moving in depth direction. Simultaneously, the line objects 51 are moved corresponding to the background image. Therefore, it is possible to display the line objects 51 as if moving in depth direction, so that it is possible to provide the timing game with sense of speed.

12 Claims, 10 Drawing Sheets

(51) Int. Cl.
*A63F 13/56* (2014.01)
*A63F 13/55* (2014.01)
*A63F 13/803* (2014.01)

(58) Field of Classification Search
USPC .................................... 463/30–35, 40–42
See application file for complete search history.

(56) References Cited

U.S. PATENT DOCUMENTS

| | | |
|---|---|---|
| 2010/0248838 A1 | 9/2010 | Miyaji et al. |
| 2011/0003639 A1 | 1/2011 | Takehiro |
| 2011/0183765 A1 | 7/2011 | Kobayashi et al. |
| 2011/0201425 A1 | 8/2011 | Katagai |
| 2012/0142436 A1 | 6/2012 | Sato |
| 2013/0109471 A1 | 5/2013 | Yamamoto |

FOREIGN PATENT DOCUMENTS

| | | |
|---|---|---|
| JP | 2001-120835 A | 5/2001 |
| JP | 2003-071134 A | 3/2003 |
| JP | 3686925 B | 8/2005 |
| JP | 2005-329052 A | 12/2005 |
| JP | 2007-111568 A | 5/2007 |
| JP | 2008-200295 A | 9/2008 |
| JP | 2009-82696 A | 4/2009 |
| JP | 2009-531153 A | 9/2009 |
| JP | 2010-148687 A | 7/2010 |
| JP | 2010-253253 A | 11/2010 |
| JP | 2011-11008 A | 1/2011 |
| JP | 2011-152297 A | 8/2011 |
| JP | 2011-189010 A | 9/2011 |
| JP | 2012-115539 A | 6/2012 |
| JP | 2012-249690 A | 12/2012 |
| JP | 2013-099439 A | 5/2013 |
| WO | WO2006/075495 A | 7/2006 |
| WO | 2007/077851 A1 | 7/2007 |
| WO | WO2007/115072 A | 10/2007 |

OTHER PUBLICATIONS

Kinect Adventures: RallyBall, video, published Nov. 5, 2010, https://www.youtube.com/watch?v=JK-65UNLIss.*
Missile Command—New and old version XBOX Live Arcade, video, published Apr. 15, 2011, https://www.youtube.com/watch?v=A3wEyN4FA_k.*
Office Action for Japanese Patent Application No. 2013-116930 dated Oct. 15, 2013 (drafted on Oct. 8, 2013).
Office Action for Japanese Patent Application No. 2013-047903 dated Nov. 5, 2013 (drafted on Oct. 30, 2013).
Office Action for Japanese Patent Application No. 2013-047903 dated Feb. 18, 2014 (drafted on Feb. 12, 2014).
Office Action for Japanese Patent Application No. 2013-250951 dated May 7, 2014 (drafted on Apr. 28, 2014).
Office Action for Japanese Patent Application No. 2013-250811 dated May 7, 2014 (drafted on Apr. 28, 2014).
Office Action for Japanese Patent Application No. 2013-250951 dated Sep. 16, 2014 (drafted on Sep. 9, 2014).
Office Action for Japanese Patent Application No. 2013-250951 dated Jan. 13, 2015 (drafted on Jan. 8, 2015).
The Japan Office Action dated May 30, 2017 in the counterpart Japanese application.
"Tales of Legendia", Electric Shock PlayStation, Media Works, Aug. 12, 2005, vol. (11th) No. 27, p. 90-91.
The Korean Office Action dated Jun. 20, 2016 in the counterpart Korean application.
Mirai, "[Sound Voltex] Ikasamalifegame (EXH)," Youtube, [online], Sep. 20, 2012 [Jun. 14, 2016 search].

* cited by examiner

GAME DEVICE

FIELD OF THE INVENTION

Technical Field

Present invention relates to a game device executing a game to input operation in predetermined timing.

Background of the Invention

In some game, a user's operation input timing is evaluated. For example, the game described in Japanese Patent No. 3686925 evaluates a user's operation input at the timing when two images overlap each other. The game described in Japanese Laid-Open Patent Application Publication No. 2007-111568 is operated on game consoles with a touch screen. In the game, touch inputs on icons displayed to music is evaluated.

In recent year, the game consoles with the touch screen is widely used. Thereby, such games described in Japanese Laid-Open Patent Application Publication No. 2007-111568 as inputting operation directly on icons displayed on the game screen increase.

Also it is known such games to touch icons moving in depth direction in predetermined timings (Ref FIG. 8 in Japanese Laid-Open Patent Application Publication No. Hei 08-305356 and FIG. 3 in Japanese Translation of PCT International Application Publication No. 2009-531153).

However, in the game described in Japanese Patent No. 3686925, the operation input is monotonous because the game is operated on buttons.

The game described in Japanese Laid-Open Patent Application Publication No. 2007-111568 is lack of variation because the icons indicating positions to touch are displayed at predetermined fixed positions on the game screen, even though the users input operation on the touch screen.

The icons move only in depth direction in the game described in Japanese Laid-Open Patent Application Publication No. Hei 08-305356 and Japanese Translation of PCT International Application Publication No. 2009-531153.

In such games that the icons move and that the users touch various positions on the touch screen, the users need to infer not only the timing but also the position to touch. Therefore, if the icons move too fast, the game will get too difficult. On the other hand, if the icons move slowly, sense of speed in the game impairs.

SUMMARY OF THE INVENTION

Thus the present invention provides a timing game having sense of speed.

The first characteristic of the present invention is a game device comprising:

an operation receiving unit receiving operation information input by a user; a background image displaying unit displaying a background image as if the background image moves in depth direction of a game screen; a line controlling unit causing a plurality of lines to appear from various positions, setting an intersection, which is obtained if extending the plurality of lines, as a virtual intersection, moving the virtual intersection in response to a movement of the background image, correcting a position of the plurality of lines in response to a movement of the virtual intersection, and moving fore ends of the plurality of lines toward the virtual intersection; and a timing evaluating unit evaluating the operation information received from the operation receiving unit by comparing the operation information with a position and a timing that the fore ends of the plurality of lines have collided with each other.

The second characteristic of the present invention is a game device comprising:

an operation receiving unit receiving operation information input by a user; an object controlling unit displaying and moving a plurality of objects so as to collide with each other; a predictive object controlling unit displaying a plurality of predictive objects indicating prediction of the plurality of objects approaching each other; and a timing evaluating unit evaluating the operation information, which is received from the operation receiving unit, based on approaching information indicating an approaching state of the plurality of objects, wherein the approaching information is received from the object controlling unit, wherein the predictive object controlling unit controls the plurality of predictive objects so as to overlap each other at a collision position and a collision timing that the plurality of objects collides with each other.

DESCRIPTION OF EMBODIMENTS

Hereinafter, it will be described one embodiment of the present invention with reference to the drawings.

Figure 1:
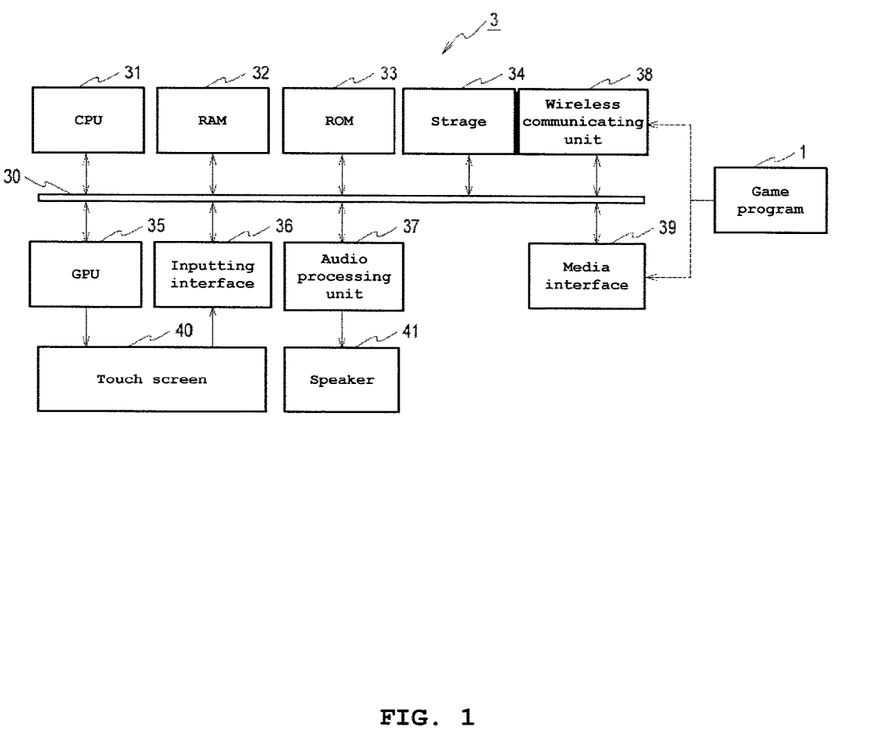
FIG. 1 is a block diagram of configuration in a game console executing a game program according to one embodiment of the present invention.

FIG. 1 is a block diagram of configuration in a game console 3 executing a game program 1 according to one embodiment of the present invention.

The game console 3 is connected to a Central Processing Unit (CPU) 31, a Random Access Memory (RAM) 32, a Read Only Memory (ROM) 33, a storage 34, a Graphic Processing Unit (GPU) 35, an inputting interface (input I/F) 36, an audio processing unit 37, a wireless communicating unit 38, and a media interface (media I/F) 39 via bus 30. The GPU 35 and the input I/F 36 are connected to a touch screen 40. The touch screen 40 displays a game screen processed by the GPU 35, and sends a touch coordinate that is detected based on where the user has touched on the touch screen to the input I/F 36. The audio processing unit 37 is connected to a speaker 41. The speaker 41 outputs audio such as sound effects and back ground music converted and amplified to analog signal by audio processing unit 37. For example, as the game console 3, a smartphone with the touch screen 40 may be applicable.

The game console 3 stores a game program 1 received from the wireless communicating unit 38 or the media I/F 39 to the storage 34. The CPU 31 loads the game program 1 stored in the storage 34 onto the RAM 32 and executes the game program 1. The CPU 31 is included in a game device that will be detailed later with the hardware resources described above. The game program 1 is able to be stored on a storage medium such as a magnetic disk, an optical disk, and a semiconductor memory. Also the game program 1 is able to be provided through a network.

<Configuration of the Game>

Subsequently, it will be described the game executed by the game program 1 according to one embodiment of the present invention.

The game is the timing game that evaluates user's operation at the timing when fore ends of a plurality of line objects appearing from game screen edges collide with each other.

Figure 2:
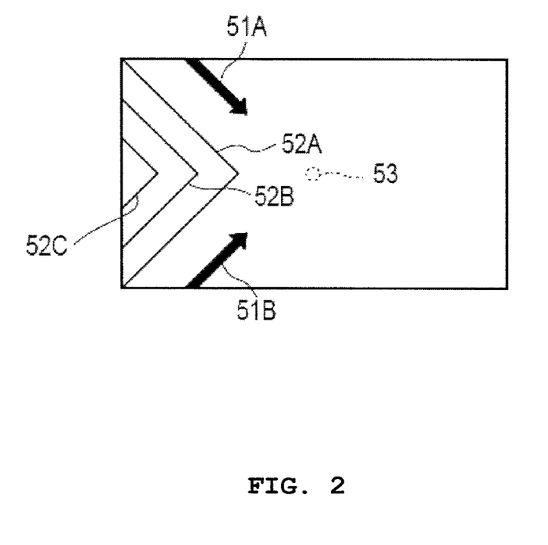
FIG. 2 is a view of a game screen according to one embodiment of the present invention.

FIG. 2 is a view of a game screen according to one embodiment of the present invention. In the game screen in FIG. 2, line objects 51A and 51B (hereinafter, line objects 51), and predictive objects 52A, 52B, and 52C (hereinafter, predictive objects 52) are displayed. In actual game screen, also information such as scores is displayed, however, it is not illustrated in the drawings. As a back ground image of the game screen, music videos matching music played on the game may be displayed. Instead of the line objects 51, objects in different forms may be applicable.

The line objects 51 appear and move from the edges of the game screen on the music played on the game console 3. Subsequently, the fore ends of the line objects 51 collide with each other at a virtual intersection 53 on the game screen. The virtual intersection 53 may not be displayed on the game screen.

The predictive objects 52 indicate prediction of the fore ends of the line objects 51 approaching each other. The predictive objects 52 are displayed prior to or simultaneously with appearance of the line objects 51 on the game screen. The predict objects 52 indicate approximate collision timing of the line objects 51 and position of the virtual intersection 53 by movement, changing color, or changing forms of themselves. FIG. 2 is illustrated with a plurality of angular lines as the predictive objects 52 indicating moving directions of the line objects 51. Moving directions of vertices of the angular lines that are the predictive objects 52 indicate position of the virtual intersection 53. Changes in distance between the predictive objects 52 indicate collision timing of the line objects 51.

Figure 3A:
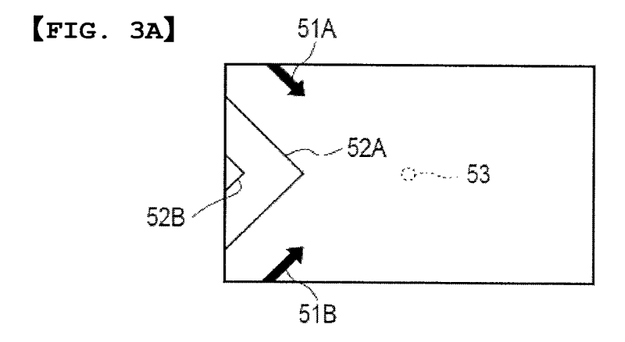
FIGS. 3A, 3B, and 3C are views of the game screen in the order of time scales.
Figure 3B:
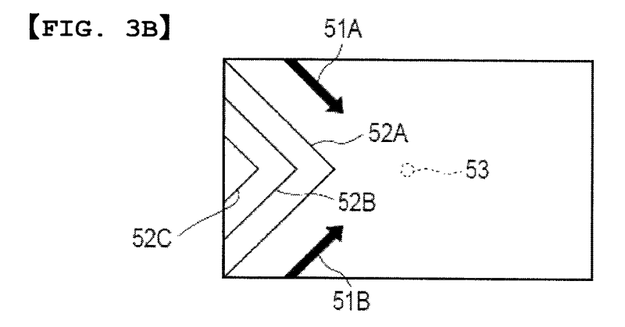
Figure 3C:
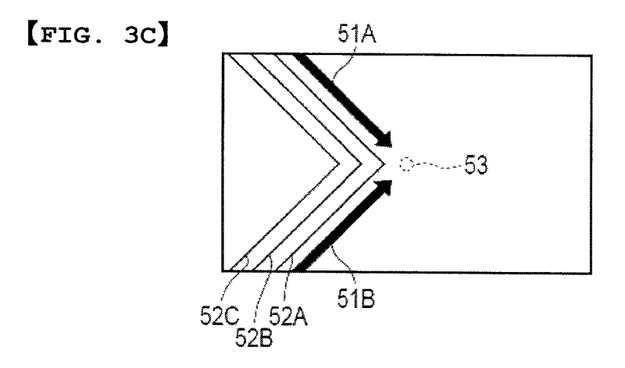

Here, it will be described movement of the line objects 51 and the predictive objects 52. FIGS. 3A, 3B, and 3C are views of the line objects 51 approaching toward the virtual intersection 53 after appearing on the game screen in the order of time scales.

As illustrated in FIGS. 3A, 3B, and 3C, the line objects 51 appear from left side of upper and lower edges of the game screen and move toward the virtual intersection 53 being around the center of the game screen. In other word, the line object 51A moves from upper left to lower right, and the line object 51B moves from lower left to upper right.

The predictive object 52A appears shortly before appearance of the line objects 51 from left side of the game screen and moves to right side. A predictive object 52B appears simultaneously with appearance of the line objects 51 while following after the predictive object 52A from left side of the game screen and moves to right side. A predictive object 52C appears after appearance of the line objects 51 while following after the predictive object 52A and 52B from left side of the game screen and moves to right side.

The later each of the predictive objects 52 appears, the faster each of the predictive objects 52 moves. Therefore, as illustrated in FIGS. 3A, 3B, and 3C, intervals of the predictive objects 52 get narrower as the line objects 51 approach toward the virtual intersection 53. The predictive objects 52 move along with time like ripple toward the virtual intersection 53 and overlap at the virtual intersection 53 when the line objects 51 collide with each other. At this time, the vertices of the angular lines being the predictive objects 52 overlap at the virtual intersection 53.

Therefore, the users are able to infer the approximate collision timing of the fore ends of the line objects 51 and position of the virtual intersection 53 from observations of the predictive objects 52.

<Configuration of the Game Device>

Next, it will be described the game device that includes the game program 1 loaded on the game console 3 according to one embodiment of the present invention.

Figure 4:
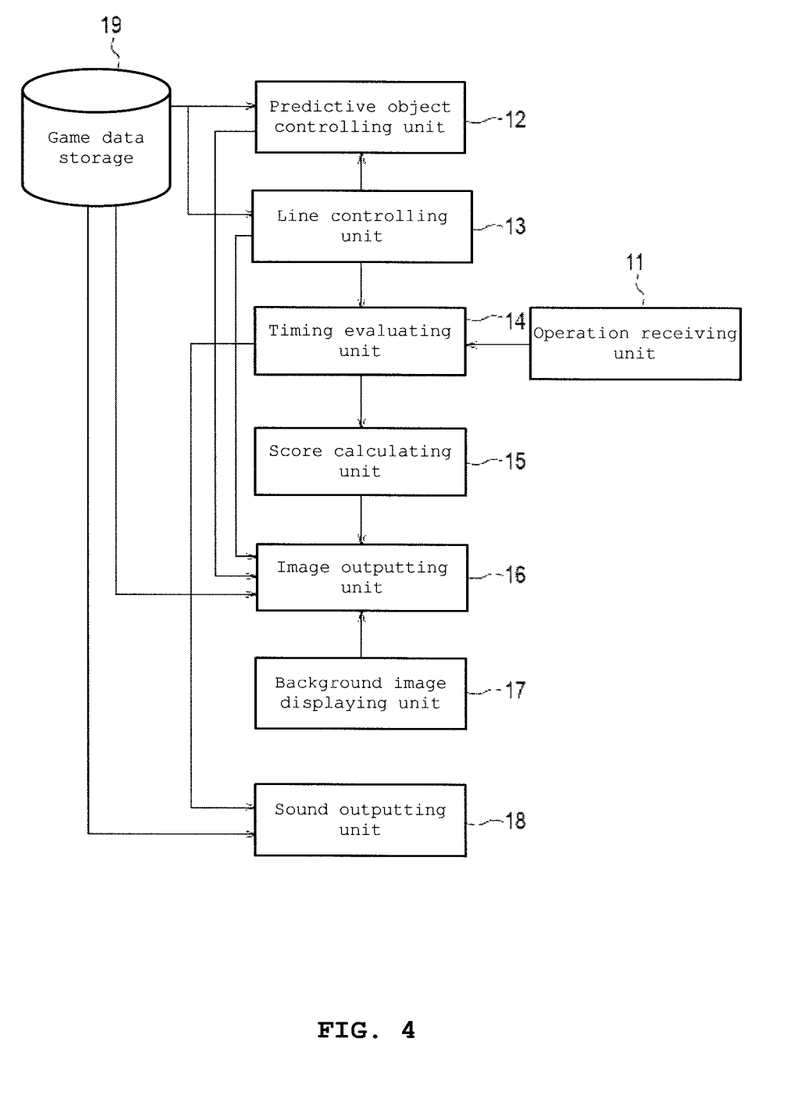
FIG. 4 is a functional block diagram illustrating a configuration of the game device including the game program according to one embodiment of the present invention.

FIG. 4 is a functional block diagram illustrating a configuration of the game device including the game program according to one embodiment of the present invention. The game device in FIG. 4 includes an operation receiving unit 11, a predictive object controlling unit 12, a line controlling unit 13, a timing evaluating unit 14, a score calculating unit 15, an image outputting unit 16, a background image displaying unit 17, a sound outputting unit 18, and a game data storage unit 19.

The operation receiving unit 11 receives operation input by the users. The users input operation by touching on the touch screen 40 of the game console 3 with their fingers or something. Operation is categorized as tapping, flicking, long pressing, and swiping. The operation receiving unit 11 receives operation information such as the touch coordinate on the game screen and operation categories and sends the operation information to the timing evaluating unit 14.

The predictive object controlling unit 12 controls movement, color, and forms of the predictive objects 52 and sends position information, color, and forms of the predictive objects 52 to the image outputting unit 16 while causing the predictive objects 52 to appear correspondingly to the line objects 51 on the game screen. Data of such as appearing timing and movement of the predictive objects 52 are loaded from the game data storage unit 19.

The line controlling unit 13 causes the line objects 51 to appear on the music output from the sound outputting unit 18 on the game screen. Simultaneously, the line controlling unit 13 controls movement of the line objects 51 so that the fore ends of the line objects 51 collide with each other. Then, the line controlling unit 13 sends position information of the line objects 51 to the image outputting unit 16. Approaching information such as position information of the virtual intersection 53 indicating the position where the fore ends of the line objects 51 collide with each other, the position information of the line objects 51, and time until the fore ends of the line objects 51 collide with each other are sent to the timing evaluating unit 14. Data of such as appearing timing and moving speed of the line objects 51 are loaded from the game data storage unit 19.

The timing evaluating unit 14 receives the operation information from the operation receiving unit 11 and the approaching information from the line controlling unit 13. Simultaneously, the timing evaluating unit 14 determines whether the user has tapped on proper position at proper timing and sends result of determination to the score calculating unit 15.

The score calculating unit 15 calculates scores based on the result of determination received from the timing evaluating unit 14. The score calculating unit 15 sends parameters such as scores to the image outputting unit 16.

The image outputting unit 16 displays the line objects 51 based on the position information of the line objects 51 received from the line controlling unit 13 and displays the predictive objects 52 based on the position information of the predictive objects 52 received from the predictive object controlling unit 12 on the game screen. The image outputting unit 16 also displays parameters and the background image on the game screen.

The background image displaying unit 17 commands the image outputting unit 16 to display the background image loaded from the game data storage unit 19 to be displayed behind the line objects 51 and the predictive objects 52.

The sound outputting unit 18 outputs sound data received from the game data storage unit 19.

The game data storage unit 19 stores image data to be displayed on the game screen, the sound data such as music and sound effects, line object appearing data, and predictive object appearing data.

The line object appearing data includes information such as the position of the virtual intersection and appearing numbers, appearing time, appearing position, moving directions, and moving speed of the line objects. The position of the virtual intersection indicates the coordinates on the game screen. The appearing numbers of the line objects indicate numbers of the line objects intersecting at the virtual intersection. The appearing time of the line objects is data of time when each of the line objects appears. For example, the appearing time of the line objects is recorded on the line object appearing data based on music playback time. The appearing position of the line objects is data including coordinates where each of the line objects appears. For example, the coordinates related to one of the corners of the game screen is recorded on the line object appearing data. The moving directions and the moving speed of the line objects are data of moving directions and moving speed of each of the line objects. The moving speed of each of the line objects may be different.

The predictive object appearing data is related to the line object appearing data. The predictive object appearing data includes information such as appearing time, appearing position, moving speed, and changing of the predictive objects. The appearing time of the predictive objects is data of time when each of the predictive objects appears. For example, the appearing time of the predictive objects is recorded on the predictive object appearing data on the basis of the music playback time. In other ways, relative time from the appearing time of the line objects to the appearing time of the predictive objects is recorded on the predictive object appearing data. The appearing position of the predictive objects is data including coordinates where each of the predictive objects appears. Moving speed of the predictive objects is data of the moving speed of each of the predictive objects. The changing of the predictive objects is data of how the color of predictive objects changes, for example.

<Procedure>

Subsequently, it will be described that the procedure of the game device stated above.

Figure 5:
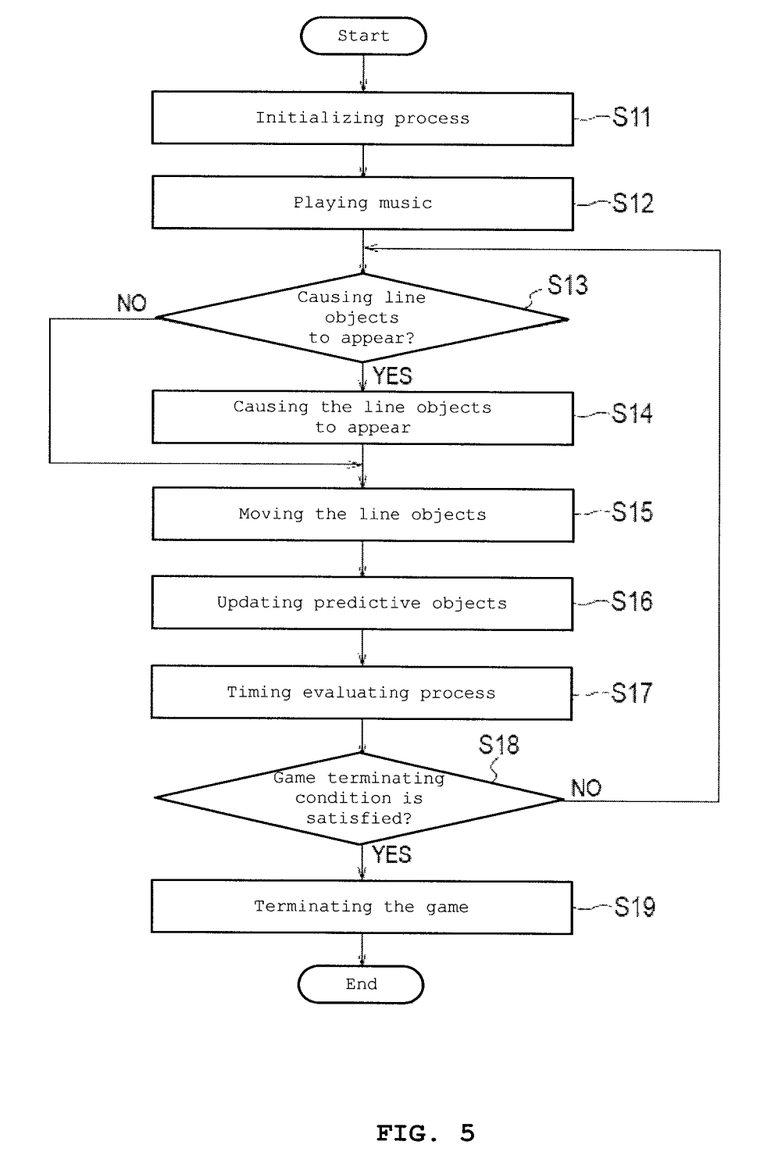
FIG. 5 is a flowchart of a whole process of the game device.

FIG. 5 is a flowchart of a whole process of the game device.

when the game is started, the game device executes an initialization process (Step S11). The initializing process includes a parameter initialization that clears score data and selection of the music to play, the line object appearing data, and the predictive object appearing data, for example. Music selected by the user or predetermined music corresponding to difficulty selected by the user will be selected.

After the initializing process, the sound outputting unit 18 starts playing the selected music (Step S12).

The line controlling unit 13 loads the line object appearing data from the game data storage unit 19 and determines whether causing the line objects 51 to newly appear (Step S13). For example, the line controlling unit 13 determines whether the line objects 51 should be newly appeared by comparing the music playback time with the appearing time of the line objects. The line controlling unit 13 determines the line objects 51 to appear when the playback time is over the appearing time of the line objects.

When the line controlling unit 13 determines the line objects 51 to appear newly (Step S13: Yes), the line controlling unit 13 and the predictive object controlling unit 12 respectively cause the line objects 51 and the predictive objects 52 to appear on the game screen (Step S14). The line controlling unit 13 causes the line objects 51 to appear at the appearing position included in the line object appearing data loaded from the game data storage unit 19. The predictive object controlling unit 12 loads the predictive object appearing data corresponding to the line objects 51 from the game data storage unit 19 and causes the predictive objects 52 appear on the game screen. The predictive objects 52 may appear prior to appearance of the line objects 51 on the game screen. In this case, the predictive objects 52 appear first, the appearing positions of the line objects 51 are set out of the game screen.

The line controlling unit 13 moves the line objects 51 at predetermined intervals (e.g. at each 60 frames per second) on the game screen (Step S15), and the predictive object controlling unit 12 updates the predictive objects 52 (Step S16). The line objects 51 and the predictive objects 52 displayed on the game screen are moved and updated at predetermined intervals.

The timing evaluating unit 14 determines whether the user has tapped on the virtual intersection 53 where the fore ends of the line objects 51 collide with each other at appropriate position and time (Step S17). This timing evaluating process will be described later.

Moreover, whether a game terminating condition is satisfied is determined (Step S18). For example, after the music has finished, it is determined that the game is completed. If frequency (times) of failure counted in the timing evaluating process is over the predetermined times, it is determined that the game is over (failed). When the game terminating condition is not satisfied (Step S18: No), the game is continued by returning to Step S13.

If the game terminating condition is satisfied (Step 18: Yes), the game is terminated after displaying the message telling that the game is completed or failed (Step S19). After terminating the game, if the game is completed, the game will be newly started by returning to Step S11; however, if the game is failed, getting back to a game starting screen (splash screen).

Figure 6:
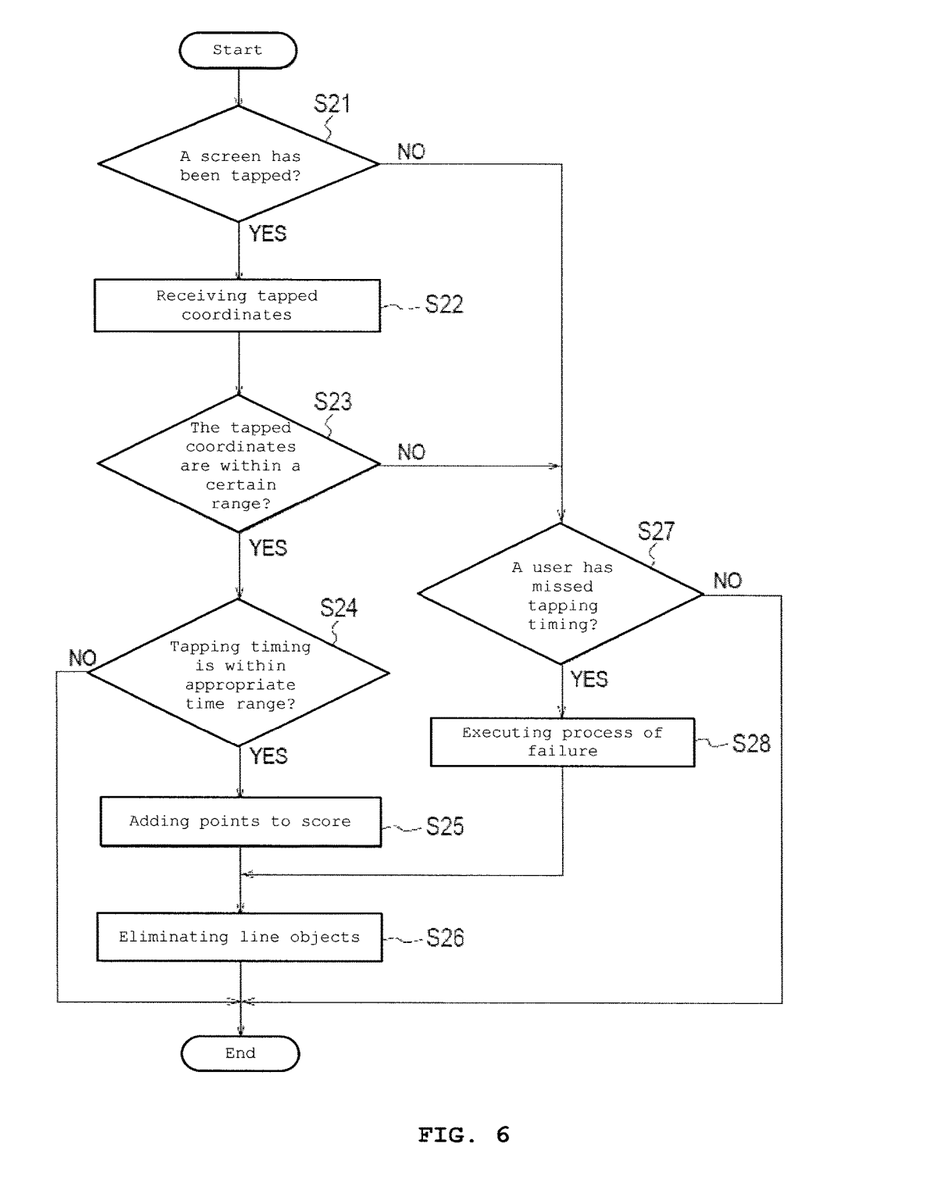
FIG. 6 is a flowchart of a timing evaluating process.

Next, the timing evaluating process will be described. In the timing evaluating process, it is determined whether the collision position on the game screen is tapped at the timing when the fore ends of the line objects 51 collide with each other.

FIG. 6 is a flowchart of the timing evaluating process.

First, the timing evaluating unit 14 determines whether the user has tapped on the game screen (Step S21)

When the user has tapped on the game screen (Step S21: Yes), the timing evaluating unit 14 receives tapped coordinates on the game screen (Step S22) and determines whether the tapped coordinates are within a certain range (Step S23). The timing evaluating unit 14 determines whether the tapped coordinates are within the certain range by comparing the tapped coordinates with the position of the virtual intersection 53 where the fore ends of the line objects 51 collide with each other.

When the tapped coordinates are within a predetermined range from the virtual intersection 53 (Step S23: Yes), the timing evaluating unit 14 determines whether the tapping timing is within appropriate time range (Step S24). Whether the tapping timing is in the appropriate time range is determined by calculating time gap between the perfect timing when the fore ends of the line objects 51 collide and the tapping timing. For example, whether the tapping timing is in the appropriate time range is determined on the basis of the approaching information including record of time until the fore ends of the line objects 51 collide with each other.

When the tapping timing is in the appropriate time range (Step S24: Yes), the score calculating unit 15 adds points in response to the tapping timing to the score (Step S25), and the line controlling unit 13 deletes tapped line objects 51 from the game screen (Step S26). When the tapping timing is the perfect timing, the score calculating unit 15 adds maximum points to the score; otherwise lesser points is added to the score.

On the other hand, when the game screen has not tapped (Step S21: No), or when the tapped position is out of the certain range (Step S23: No), the timing evaluating unit 14 determines whether the user has missed the tapping timing when the virtual intersection 53 should be tapped on (Step S27). After the collision of the fore ends of the line objects 51, when predetermined time has passed by, the timing evaluating unit 14 determines that the user has missed the tapping timing.

When the user has missed the tapping timing (Step S27: Yes), the score calculating unit 15 determines that the user has not been able to tap on the collision positions of the line objects 51 at the appropriate time. Moreover, the score calculating unit 15 executes a process of failure (Step S28). The line controlling unit 13 deletes the line objects 51 that are not tapped on from the game screen (Step S26).

<Variation>

Continuously, variations of the line objects and predictive objects will be described.

FIGS. 7A, 7B, 7C, and 7D are views illustrating variations of line objects and predictive objects. Hereinafter, each of the variations of the line objects and predictive objects will be described.

Figure 7A:
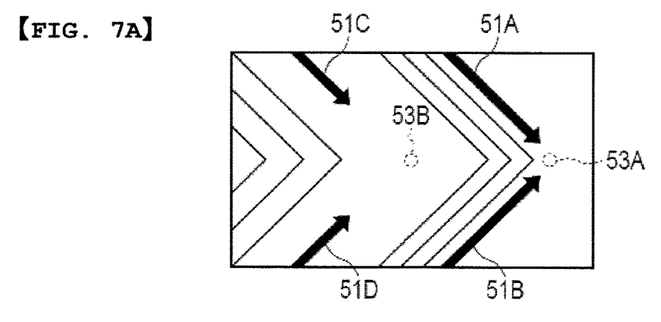
FIGS. 7A, 7B, 7C, and 7D are views illustrating variation of line objects and predictive objects.

FIG. 7A is a view illustrating one embodiment of a plurality of pairs of the line objects appearing at the same time. In FIG. 7A, a pair of line objects 51A and 51B are colliding at the virtual intersection 53A and a pair of line objects 51C and 51D colliding at the virtual intersection 53B respectively appear on the game screen. The user taps on the virtual intersections 53A and 53B in this order. In FIG. 7A, each of the line objects 51 moves at the same angle to each sides of the game screen, however, the angle may be different for each sides of the game screen. For example, the line object 51A moves at a 45 degree to upper side of the game screen, and the line object 51B moves at a 90 degree to lower side of the game screen. Moving speed of each of the line objects 51 may be the same or different from each other. For example, it will get difficult to tap when the line controlling unit 13 sets the moving speed of the line object 51A faster than the moving speed of the line object 51B. The moving speed of each of the line objects 51 may be constant or changed at predetermined time after appearing. For example, the speed may be changed after the line objects 51 have momentarily disappeared.

Figure 7B:
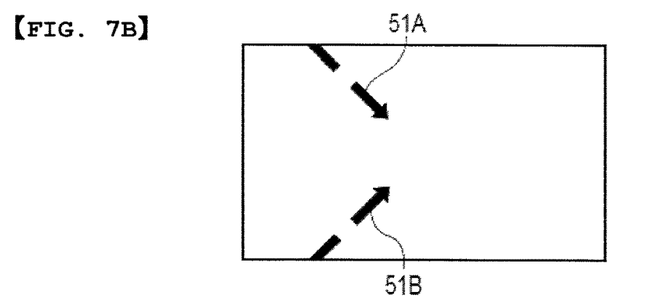

FIG. 7B is a view illustrating one embodiment of that the line objects 51 are appearing or disappearing. In FIG. 7B, while the line objects 51 move, the line objects 51 are temporary not displayed. Besides, some parts of the line objects 51 are not displayed. When the line objects 51 are not displayed, the predictive objects may either be displayed or not be displayed.

Figure 7C:
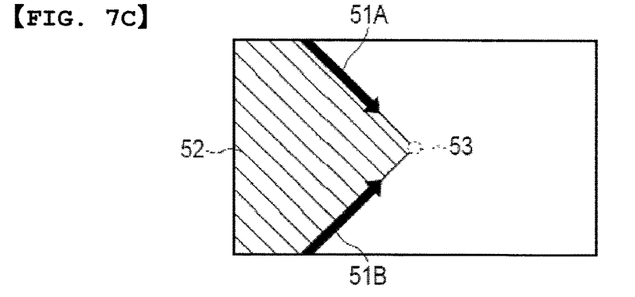

FIG. 7C is a view illustrating one embodiment of that the collision of the line objects is predicted from changing color. In FIG. 7C, a pentagon part partitioned by the line objects 51 at the time when the line objects 51 collide is the predictive object 52 changing color. The predictive object 52 changes color in response to the movement of the line objects 51. For example, at first when the predictive object 52 appears, the color is black or transparent not to be distinguished. After that, the color is gradually turning red or reducing transparency. The user is able to know the approximate collision timing of the line objects 51 from the shading of color or transparency of the predictive object 52. Also the user is able to know moving directions of the line objects 51 and the position of the virtual intersection 53 from the form of the predictive object 52.

Figure 7D:
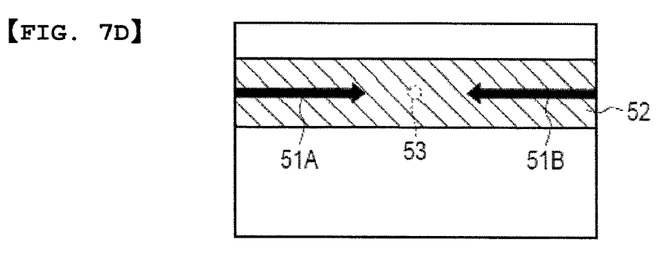

FIG. 7D is a view illustrating one embodiment of that the collision of the line objects is predicted from changing thickness of line. In FIG. 7D, thick hatched line including the line objects 51 and the virtual intersection 53 is the predictive object 52. The predictive object 52 is gradually getting thinner in response to approach of the line objects 51. The user is able to know the approximate collision timing of the line objects 51 from changes of thickness of the predictive object 52. Also, the user is able to know the moving directions of the line objects 51 and approximate position of the virtual intersection 53 from the position of the predictive object 52.

Figure 8A:
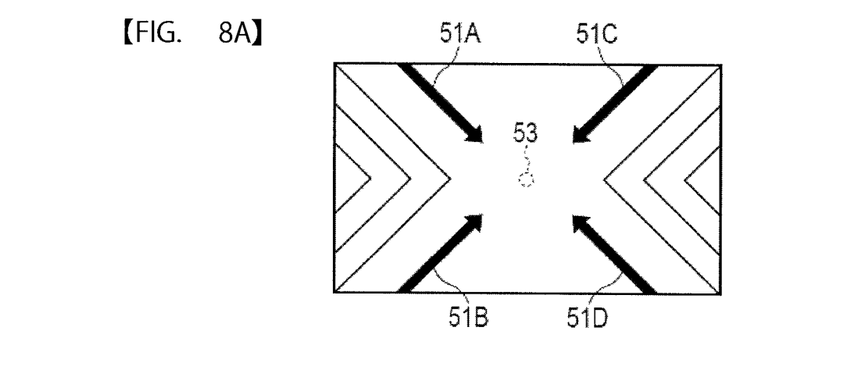
FIGS. 8A and 8B are views illustrating a collision of four line objects according to one embodiment of the present invention.
Figure 8B:
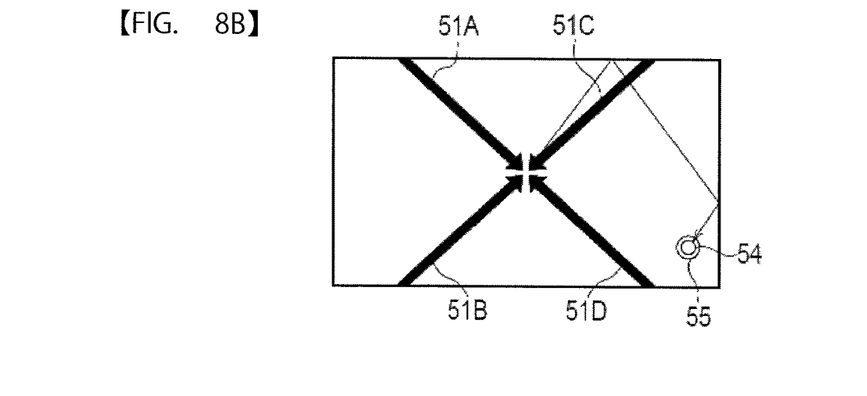

FIGS. 8A and 8B are views illustrating one embodiment that the four line objects collide. As illustrated in FIG. 8A, the colliding line objects may be more than two. For example, each of four line objects 51A, 51B, 51C, and 51D (hereinafter, four line objects 51) may collide at the virtual intersection 53. When the four line objects 51 collide with each other, the operation input to be instructed to the user may be flicking or long pressing instead of tapping. Moreover, as indicated in FIG. 8B, if the four line objects 51 collide at the virtual intersection 53, at the time when the user has touched on the collision position, a sphere 54 appears at the position where the user has touched on, and a circle 55 appears at any position on the game screen. Subsequently, the line controlling unit 13 moves the sphere 54 in response to the flick input by the user. If the sphere 54 gets inside the circle 55, the line controlling unit 13 adds predetermined points to the scores. The sphere 54 may bounce off each sides of the game screen or directly get inside the circle 55. The movement of the sphere 54 is determined based on timing, angle, speed, and length of the flick input by the user. The length of the flick input indicates distance as measured from starting point to ending point of the touched position.

Any kinds of operation method (e.g. Tapping, flicking, long pressing) in response to not only numbers of the colliding line objects but also attributes such as thickness or color of the line objects 51 may be instructed to the users.

<Line Objects' Moving in a Depth Direction>

In the embodiments described above, the line objects have only moved in the moving directions of the line objects. Here, it will be described one embodiment displaying the line objects as if moving in depth direction by moving the line objects in the directions other than the moving directions of the line objects.

Figure 9A:
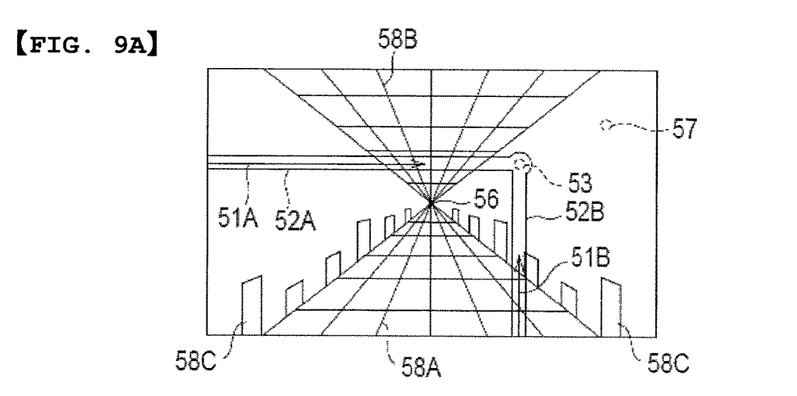
FIGS. 9A, 9B, and 9C are views of moving positions of line objects displayed on the game screen in the order of time scales.
Figure 9B:
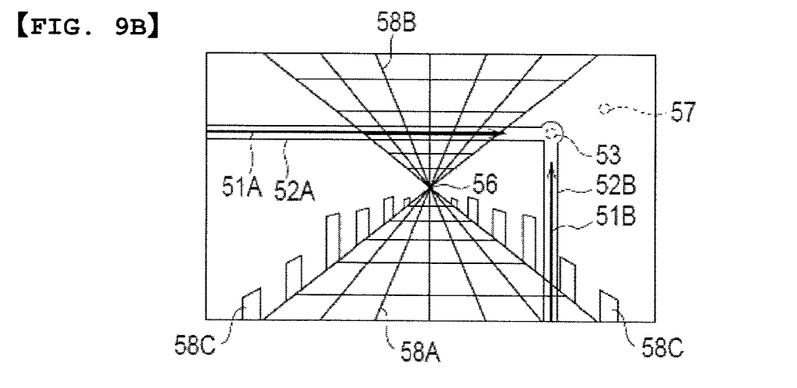
Figure 9C:
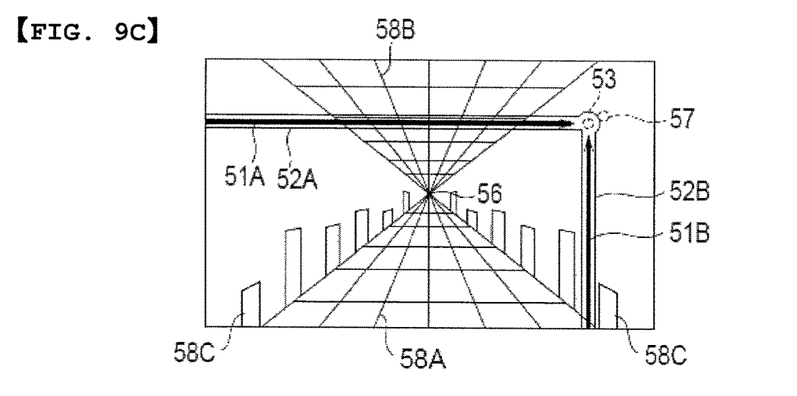

FIGS. 9A, 9B, and 9C are views of moving positions of the line objects displayed on the game screen in chronological order. As described in FIGS. 9A, 9B, and 9C, the line objects 51 and the predictive objects 52A and 52B (hereinafter predictive objects 52) being superimposed on the background image with sense of depth in perspective are displayed. In addition, display positions of the line objects 51 are moved as if the line objects 51 is moving from depth toward front of the game screen (in the depth direction).

The background image displaying unit 17 provides sense of depth to the game screen by creating a floor 58A and a ceiling 58B of the background image described with lines radiating from the vanishing point 56 being at the center of the game screen. The background image displaying unit 17 displays volume bar meters 58C indicating volume of the music on both sides of the floor 58A. As the background image displaying unit 17 moves display positions of the floor 58A, the ceiling 58B, and the volume bar meters 58C from depth toward front side of the games screen for every frame, the users are able to feel as if moving to the vanishing point 56. One embodiment of the present invention, the background image displaying unit 17 moves horizontal lines of the floor 58A to the lower side of the game screen, horizontal lines of the ceiling 58B to the upper side of the game screen, and both sides of left and right volume bar meters 58C to the lower left and right sides of the game screen so as to move away from the vanishing point 56. Also, the background image displaying unit 17 changes moving speed of the floor 58A, the ceiling 58B, and the volume bar meters 58C corresponding to tempo (beats per minute) of the music. The floor 58A, the ceiling 58B, and the volume bar meters 58C are a background image for expressing sense of depth and sense of speed, so these are not related to operation input by the user. The background image is displayed as if moving in depth direction by moving the floor 58A, the ceiling 58B, and the volume bar meters 58C away from the vanishing point 56, so that the sense of speed may be expressed.

The line controlling unit 13 displays the line objects 51 superimposing on the background image with sense of depth and moves the display positions of the line objects 51 away from the vanishing point 56. One embodiment indicated in FIGS. 9A, 9B, and 9C, the line controlling unit 13 moves the line object 51A, which is displayed above the vanishing point 56 and moved in horizontal direction, upward in response to elapsed time. Simultaneously, the line controlling unit 13 moves the line object 51B, which is displayed rightward from the vanishing point 56 and moved in vertical direction, rightward in response to elapsed time. Also, size (thickness) of the line objects 51 is getting bigger (thicker) in response to the elapsed time.

The predictive objects 52 are displayed to indicate not the collision position 57 where the line objects 51 will collide finally but the virtual intersection 53 being an intersection in case the line objects 51 are extended from the present position. In one embodiment in FIGS. 9A, 9B, and 9C, the predictive objects 52 are illustrated as rectangular shaped objects. The predictive object 52A is moving in the direction of the length of the line object 51B, and the predictive object 52B is moving in the direction of the length of the line object 51A. The intersection of the two of rectangular shaped predictive objects 52 is where the virtual intersection 53 is.

Subsequently, it will be described the process calculating the display positions of the line objects 51 and the predictive objects 52.

The display positions of the line objects 51 are determined based on the position of the virtual intersection 53 moving from the vanishing point 56 to the collision position 57 in response to elapsed time. The position of the virtual intersection 53 is determined based on the liner interpolation between the vanishing point 56 and the collision position 57 in response to the time lapse.

Figure 10A:
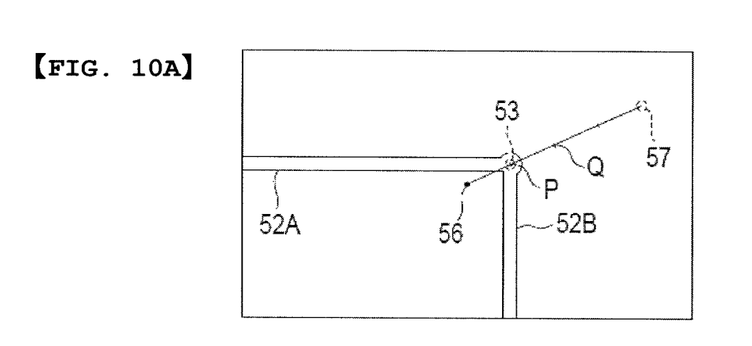
FIGS. 10A and 10B are views of moving positions of the virtual intersection.
Figure 10B:
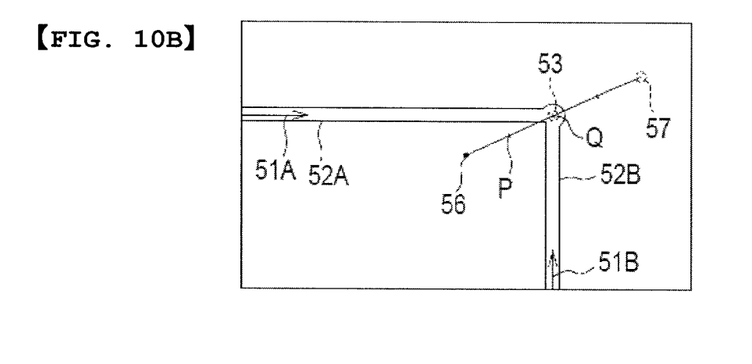

FIGS. 10A and 10B are views of moving positions of the virtual intersection 53. In one embodiment in FIGS. 10A and 10B, the virtual intersection 53 is moved from vanishing point 56 to the collision position 57 for one bar phrase of music. On the one hand, the predictive objects 52 appear three beats before the perfect timing; the perfect timing is when the fore ends of the line objects 51 collide, and the line objects 51 appear two beats before the perfect timing.

As illustrated in FIG. 10A, three beats before the perfect timing, when the predictive objects 52 appear, the virtual intersection 53 is displayed at a point P where three quarter of distance from the collision position 57 to the vanishing point 56, and then, the predictive objects 52 are displayed based on the virtual intersection 53. For example, the predictive object controlling unit 12 displays the rectangular shaped predictive objects 52 from the intersection 53 to the sides where the line objects appear.

The line controlling unit 13 moves the virtual intersection 53 to the collision position 57 on a line segment joining the vanishing point 56 and the collision position 57 and also corrects the display positions of the predictive objects 52 in response to position of the virtual intersection 53 in response to elapsed time.

As illustrated in FIG. 10B, two beats before the perfect timing, when the line objects 51 appear, The line controlling unit 13 moves the virtual intersection 53 to a point Q the half way of the line segment from the collision position 57 to the vanishing point 56. The predictive object controlling unit 12 displays the predictive objects 52 based on the virtual intersection 53, and the line controlling unit 13 causes the line objects 51 to appear based on the virtual intersection 53. For example, the line controlling unit 13 causes the line object 51A to appear from horizontal position of the virtual intersection 53 on the left sides of the game screen and the line object 51B appear from vertical position of the virtual intersection 53 on the lower sides of the game screen.

Subsequently, the line controlling unit 13 moves the line objects 51 and the virtual intersection 53 to the collision position 57. The line controlling unit 13 and the predictive object controlling unit 12 correct the display positions of the line objects 51 and the predictive objects 52 based on the position of the virtual intersection 53. At the perfect timing, the virtual intersection 53 reaches the collision position 57, and simultaneously the fore ends of the line objects 51 collide with each other at the collision position 57. By user's tapping on the collision position of the line objects 51 on the game screen at the perfect timing, scores are added. The timing evaluating unit 14 compares tap position of the user with the collision position and tap time of the user with the perfect timing. The timing evaluating unit 14 determines success or failure from position difference between the tap position and the collision position and the time gap between the tap time and the perfect timing. The timing evaluating unit 14 determines success if the position difference or/and the time gap is/are in the predetermined range, and determines failure if the position difference or/and the time gap is/are over the predetermined range.

If the moving speed of the line objects 51 is set fast on the game setting, for example, the predictive object controlling unit 12 sets the appearing time of the predictive objects 52 at two beets before the perfect timing while the line controlling unit 13 sets the appearing time of the line objects 51 at one beet before the perfect timing. If the moving speed of the line objects 51 is set slow, the predictive object controlling unit 12 sets the appearing time of the predictive objects 52 at four beets before the perfect timing while the line controlling unit 13 sets the appearing time of the line objects 51 at three beets before the perfect timing.

Such setting that the predictive objects 52 are not displayed may be applicable. If the predictive objects 52 are not displayed, and if only the display position of the line objects 51 are moved, it is difficult to infer the collision position of the line objects 51, so that difficulty of the game increases.

<Three Dimensional Virtual Space>

One embodiment explained above, the background image displaying unit 17 displays the line objects as if moving in depth direction, by displaying the line object superimposing on the background image with depth and by moving the display positions of the line objects. Hereinafter, it will be described one embodiment moving the line objects not only in vertical and horizontal direction but also in depth direction in three-dimensional virtual space.

If the line objects are positioned in three dimensional (3D) virtual space, the line objects are positioned, moved, and caused to collide on a picture plane parallel to the game screen by using perspective projection. By causing viewpoint where the virtual camera is positioned in the virtual space to approach to the picture plane where the line objects are positioned or by causing the line objects to approach to the viewpoint, the line objects are displayed as if moving in depth direction that is the direction vertical to the game screen. When the fore ends of the line objects collide with each other, the operation input by the user on the game screen corresponding to the collision position will be evaluated.

The image outputting unit 16 displays the two dimensional (2D) image converted from 3D virtual space and projected on the 2D picture plane by using perspective projection as a game screen. About ways of displaying the line objects, the line objects having thickness positioned on the 3D virtual space are converted into 2D image by using the perspective projection, and then the line objects are displayed on the game screen as 2D images. In second way, the positions of the line objects on the game screen is calculated by projecting only the display positions of the line objects on the picture plane, and then the line objects are displayed on the calculated positions of the line objects on the game screen. In the second way, the image outputting unit 16 determines thickness of the line objects based on the distance in depth.

About ways of displaying the predictive objects, same as the line objects, the predictive objects having thickness are positioned on the 3D virtual space. In second way, the positions of the predictive objects are calculated by projecting the collision position of the line objects: the position of the virtual intersection, on the 2D picture plane, and then the predictive objects are displayed based on the calculated position of the virtual intersection on the game screen.

The thickness of the line objects displayed on the game screen at the time of collision will be fixed, by setting the perfect timing when the fore ends of the line objects collide at the time when the depth distance between the viewpoint and the picture plane on where the line objects are positioned reaches to predetermined distance.

<Match>

Subsequently, one embodiment that the user plays a match with an opponent (opponent user) in the present game will be described.

First, the game device accesses a server and matches users. The opponent user of the user is selected from users registered by the user or selected randomly from users who have nearly same operating technique as the user.

After loading the play data of the opponent, the game devices start the game. The server stores information such as identifying name and identification (ID) of the user or of the game device, in addition, (1) a play data (ghost data) of every users when marking the highest score on every music and in every difficulty, and (2) the latest hundreds of play data (ghost data) of every users on every music and in every difficulty. When the user selects the opponent from the registered users, (1) will be loaded. In other hand, when the user selects the opponent from users having nearly same operation technique as the user, (2) will be loaded.

the game device displays score difference between the user and the opponent under the user's own score on the game screen during the game. The score difference is calculated by subtracting the opponent's score based on the play data loaded from the server from the user's score during the game, if the user and the opponent start the game simultaneously.

After the game, result of the game will be displayed. Continuously, the result of the match is displayed with numeric values on the result screen. Because the latest hundreds of play data are used, the play data of the user is sent to the server for every one game.

For example, the game device stores input data (operation inputting information) based on the operation input by the user as the play data and sends the input data to the server after the game to make the server store the input data. The game device of the user playing match loaded the opponent's input data from the server and calculates the score of the opponent along with the game progress by using the opponent's input data as the opponent's operation input. In other way, the game device and the opponent's game device communicate directly through such as peer to peer communication and processes match in real time by mutually sending and receiving input data.

As explained above, in accordance with one aspect of the present invention, in the timing game that the user taps on the collision position at the time when the fore ends of the line objects 51 collide, the background image with depth is displayed as if moving in depth direction. Therefore, the line objects 51 is displayed as if moving in depth direction by moving the line objects 51 corresponding to the background image, it is possible to provide the timing game having sense of speed.

In accordance with one aspect of the present invention, the line controlling unit 13 moves the virtual intersection 53 being in the moving directions of the line objects 51 to the collision position 57 to display the line objects 51 as if moving in depth direction. Since the position of the virtual intersection 53 of when the predictive objects 52 and the line objects 51 appear and the collision position 57 where the line objects 51 actually collide will be different, it is difficult to infer the collision timing and position of the fore ends of the line objects 51, so that it is possible to enhance interest.

In accordance with one aspect of the present invention, in the tapping game that the user taps on the collision position where the fore ends of the plurality of moving line objects collide on the 3D virtual space, by converting 3D virtual image to 2D picture plane with perspective projection and moving the position of the virtual camera to the line objects, so that the present invention enable the line objects to move not only on plane of the game screen but also in depth direction.

In accordance with one aspect of the present invention, in the timing game that the user taps on the collision position at the time when the fore ends of the line objects 51 collide, by displaying the predictive objects 52 and by indicating that the fore ends of the line objects 51 approach each other, users can infer the collision position and timing of the line objects 51. Therefore, the line objects 51 can be moved fast, so that it is possible to provide the game with sense of speed. Furthermore, the game screen changes dynamically with the predictive objects 52.

INDUSTRIAL APPLICABILITY

As explained above, In accordance with one aspect of the present invention, it is possible to provide the game with sense of speed.

REFERENCE SIGNS LIST

1 game program
11 operation receiving unit
12 predictive object controlling unit
13 line controlling unit
14 timing evaluating unit
15 score calculating unit
16 image outputting unit
17 background image displaying unit
18 sound outputting unit
19 game data storage unit
51A, 51B, 51C, and 51D line objects
52, 52A, 52B, and 52C predictive objects
53, 53A, 53B virtual intersections
54 sphere
55 circle
56 vanishing point
57 collision position
58A floor
58B ceiling
58C volume bar meters

The invention claimed is:

1. A game device comprising:
an operation receiving unit receiving operation information including tapped coordinates indicating where a tapped position is on a game screen, the operation information being input by a user;
an object controlling unit displaying and moving a plurality of objects in accordance with music played so as to cause the plurality of objects to collide with each other at a predetermined collision position;
a predictive object controlling unit displaying each of a plurality of predictive objects at a point away from the plurality of objects in response to movements of the plurality of objects to indicate prediction of the plurality of objects approaching each other; and
a timing evaluating unit calculating a game score by evaluating whether or not the tapped position is within a predetermined range from the collision position and whether or not a tapping timing is within a predetermined time range based on a collision timing of the plurality of objects,
wherein the predictive object controlling unit displays each of the plurality of predictive objects so as to overlap each of the plurality of predictive objects and the plurality of objects at the collision position and the collision timing when the plurality of objects collides with each other, and then deletes the plurality of objects and the plurality of predictive objects from the game screen.

2. The game devise according to claim 1,
wherein the plurality of predictive object indicates the collision position and/or the collision timing that the plurality of objects collides with each other.

3. The game devise according to claim 1, further comprising:
a background image displaying unit displaying a background image including background objects moving away from a vanishing point on the game screen,
wherein the object controlling unit further sets a virtual intersection, moves the virtual intersection toward the collision position in response to a movement of the background objects, corrects a position of the plurality of objects in response to a movement of the virtual intersection, and moves the plurality of objects toward the virtual intersection.

4. The game device according to claim 3,
wherein the object controlling unit further places the virtual intersection onto a line segment joining the vanishing point and the collision position, and moves the virtual intersection toward the collision position in response to a movement of the background objects.

5. A non-transitory computer-readable storage medium storing a program for causing a computer to execute:
an operation receiving process receiving operation information including tapped coordinates indicating where a tapped position is on a game screen, the operation information being input by a user;
an object controlling process displaying and moving a plurality of objects in accordance with music played so as to cause the plurality of objects to collide with each other at a predetermined collision position;
a predictive object controlling process displaying each of a plurality of predictive objects at a point away from the plurality of objects in response to movements of the plurality of objects to indicate prediction of the plurality of objects approaching each other; and
a timing evaluating process calculating a game score by evaluating whether or not the tapped position is within a predetermined range from the collision position and whether or not a tapping timing is within a predetermined time range based on a collision timing of the plurality of objects,
wherein in the predictive object controlling process, the computer displays each of the plurality of predictive objects so as to overlap each of the plurality of predictive objects and the plurality of objects at the collision position and the collision timing when the plurality of objects collides with each other, and then deletes the plurality of objects and the plurality of predictive objects from the game screen.

6. The non-transitory computer-readable storage medium according to claim 5,
wherein the plurality of predictive objects indicates the collision position and/or the collision timing that the plurality of objects collides with each other.

7. The non-transitory computer-readable storage medium according to claim 5, further causing the computer to execute:
a background image displaying process displaying a background image including background objects moving away from a vanishing point on the game screen, wherein the object controlling process further sets a virtual intersection, moves the virtual intersection toward the collision position in response to a movement of the background objects, corrects a position of the plurality of objects in response to a movement of the virtual intersection, and moves the plurality of objects toward the virtual intersection.

8. The non-transitory computer-readable storage medium according to claim 7,
wherein the object controlling process further places the virtual intersection onto a line segment joining the vanishing point and the collision position, and moves the virtual intersection toward the collision position in response to a movement of the background objects.

9. A game method of controlling a game device comprising:
an operation receiving step receiving operation information including tapped coordinates indicating where a tapped position is on a game screen, the operation information being input by a user;
a controlling objects step displaying and moving a plurality of objects in accordance with music played so as to cause the plurality of objects to collide with each other at a predetermined collision position;
a controlling predictive objects step displaying each of a plurality of predictive objects at a point away from the plurality of objects in response to movements of the plurality of objects to include prediction of the plurality of objects approaching each other; and
a timing evaluating step calculating a game score by evaluating whether or not the tapped position is within a predetermined range from the collision position and whether or not a tapping timing is within a predetermined time range based on a collision timing of the plurality of objects,
wherein in the predictive object controlling step, the game device displays each of the plurality of predictive objects so as to overlap each of the plurality of predictive objects and the plurality of objects at the collision position and the collision timing that the plurality of objects collides with each other, and then deletes the plurality of objects and the plurality of predictive objects from the game screen.

10. The game method of controlling a game device according to claim 9,
wherein the plurality of predictive objects indicates the collision position and/or the collision timing that the plurality of objects collides with each other.

11. The game method of controlling a game device according to claim 9, further comprising:
a background image displaying step displaying a background image including background objects moving away from a vanishing point on the game screen,
wherein the object controlling step further sets a virtual intersection, moves the virtual intersection toward the collision position in response to a movement of the background objects, corrects a position of the plurality of objects in response to a movement of the virtual intersection, and moves the plurality of objects toward the virtual intersection.

12. The game method of controlling a game device according to claim 11,
wherein the object controlling step further places the virtual intersection onto a line segment joining the vanishing point and the collision position, and moves the virtual intersection toward the collision position in response to a movement of the background objects.

* * * * *